United States Patent [19]

Ohkubo

[11] Patent Number: 4,869,128
[45] Date of Patent: Sep. 26, 1989

[54] PLANETARY GEAR TRAIN FOR AUTOMATIC TRANSMISSION

[75] Inventor: Masahiro Ohkubo, Kadomo, Japan

[73] Assignee: Kabushiki Kaisha Daikin Seisakusho, Osaka, Japan

[21] Appl. No.: 39,141

[22] Filed: Apr. 16, 1987

[30] Foreign Application Priority Data

| Apr. 30, 1986 | [JP] | Japan | 61-101504 |
| Apr. 30, 1986 | [JP] | Japan | 61-101505 |
| Apr. 30, 1986 | [JP] | Japan | 61-101506 |
| May 1, 1986 | [JP] | Japan | 61-101446 |

[51] Int. Cl.$^4$ .......................................... F16H 47/04
[52] U.S. Cl. ...................................... 74/677; 74/731; 74/688; 74/759; 192/3.24
[58] Field of Search ............... 74/758, 759, 753, 754, 74/732, 731, 688, 677; 192/3.22, 3.23, 3.24

[56] References Cited

U.S. PATENT DOCUMENTS

| 2,325,876 | 8/1943 | Pollard | 74/677 |
| 2,624,215 | 1/1953 | McRae | 74/677 |
| 2,749,777 | 6/1956 | Simpson | 74/732 X |
| 2,889,715 | 6/1959 | De Lorean | 74/677 |
| 3,073,183 | 1/1963 | Kelley | 74/759 X |
| 3,090,252 | 5/1963 | Mamo | 74/677 |
| 3,121,342 | 2/1964 | Breting et al. | 74/732 X |
| 3,339,431 | 9/1967 | Croswhite et al. | 74/759 X |
| 3,359,827 | 12/1967 | Chapman, Jr. et al. | 74/688 |
| 3,863,524 | 2/1975 | Mori et al. | 74/759 X |
| 4,143,562 | 3/1979 | Murakami et al. | 74/759 X |
| 4,497,219 | 2/1985 | Elsner | 74/758 X |
| 4,653,347 | 3/1987 | Hiraiwa | 74/758 X |
| 4,662,243 | 5/1987 | Kawai et al. | 74/732 X |
| 4,724,720 | 2/1988 | Ohkubo | 74/688 X |

FOREIGN PATENT DOCUMENTS

| 241013 | 7/1959 | Australia | 74/688 |
| 2627844 | 1/1977 | Fed. Rep. of Germany | 74/688 |

Primary Examiner—Leslie A. Braun
Assistant Examiner—Christopher Campbell
Attorney, Agent, or Firm—Armstrong, Nikaido, Marmelstein, Kubovcik & Murray

[57] ABSTRACT

In an automatic transmission incorporating a planetary gear transmission at a rear stage of a four-element torque converter comprising two stators, a turbine and a pump; a planetary gear train of an automatic transmission, wherein a reversal torque of a first stator reversing in a low speed ratio zone is converted into a normal torque by the planetary gear train so that this output from the first stator can be added to an output shaft, when a first speed of the planetary gear transmission is selected; a friction element is provided for limiting a rotation of the first stator in the speed ratio zone where the first stator rotates in the reverse direction, a one-way clutch for transmitting a torque only in a specified direction is installed, and the first stator is permitted to run idle by this one-way clutch so that a fluid loss in a stator portion can be minimized, when a second speed of the planetary gear transmission is selected.

12 Claims, 6 Drawing Sheets

PLANETARY GEAR TRAIN FOR AUTOMATIC TRANSMISSION

BACKGROUND OF THE INVENTION (Industrial Useful Field)

This invention relates to an improvement in a planetary gear train which constitutes, for example, an automatic transmission for automobile in combination with a four-element torque converter.

(Prior Art and its Problem)

A conventional Simpson's planetary gear train of this type is constructed as illustrated in FIG. 2.

The planetary gear, in FIG. 2, includes a pair of planetary gear assemblies 10 & 12 comprising planetary gears, planetary carriers, sun gears and ring gears disposed at a rear stage of a three-element torque converter consisting of a stator, a turbine and a pump; two sun gears 14 & 16 connected together; a planetary carrier 18 connected to ring gear 20; and an output from planetary carrier 18.

Brakes B1 & B2 and clutches C1 & C2 for controlling such gears are arranged in such Simpson gear train and the brakes together with the clutches work as "0" in the following Table 1 to carry out a speed change of three forward speeds and one reverse speed.

TABLE 1

| | (Prior Art) | | | |
|---|---|---|---|---|
| | Brake & clutch | | | |
| | C1 | C2 | B1 | B2 |
| 1st | — | 0 | — | 0 |
| 2nd | — | 0 | 0 | — |
| 3rd | 0 | 0 | — | — |
| Rev | 0 | — | — | 0 |

A stage number of speed change has recently been multiplied from three forward speeds to four forward speeds in order to improve a performance of tractive force.

In the foregoing Simpson's planetary gear train, however, the speed change of three forward speeds and one reverse speed is used and a speed change of four forward speeds and one reverse speed becomes complicated in structure and is unsuitable for practical application.

Further, a conventional general Ravineaux planetary gear train is constructed as illustrated in FIG. 3 and includes.

A planetary gear 110 which is comparatively long in its axial direction and meshes with a sun gear 116 and a ring gear 120 to form a single row planetary gear. Moreover, the planetary gear 110 is carried by a planetary carrier 114, a planetary gear 112 is carried by the planetary carrier 114 while meshing with the planetary gear 110, and the planetary gear 112 meshes with a sun gear 118 to form a double row planetary gear. Furthermore, a ring gear 120 meshing with an outer periphery of the planetary gear 110 is connected to an output gear 122.

Brakes B1 & B2 and clutches C1, C2 & C3 for controlling these gears are arranged therein, and the brakes together with the clutches work, as tabulated "0" in the following Table 2, to carry out a speed change of four forward speeds and one reverse speed.

For a speed change of three forward speeds, the clutch C3 is omitted.

TABLE 2

| | (Prior Art) | | | | |
|---|---|---|---|---|---|
| | Brake & clutch | | | | |
| | C1 | C2 | C3 | B1 | B2 |
| 1st | — | 0 | — | — | 0 |
| 2nd | — | 0 | — | 0 | — |
| 3rd | 0 | 0 | — | — | — |
| 4th | — | — | 0 | 0 | — |
| Rev | 0 | — | — | — | 0 |

A stage number of speed change has recently been multiplied from four forward speeds to five forward speeds in order for improving performance of tractive force.

In the conventional planetary gear train, however, the number of clutches will increase with an increase in a stage number of speed changes, and the structure and control become complicated.

(Object of the Invention)

An object of the invention is to improve performances of tractive force for a starting first speed and a next second speed to decrease one speed change stage from the stage number of speed change in a planetary gear train combined with a four-element torque converter, so that its structure and control can be simplified to provide structures of Simpson's and Ravineaux's planetary gear train applied with the present invention.

(Structure of the Invention)

(1) Technical measure

In an automatic transmission incorporating a planetary gear transmission at a rear stage of a four-element torque converter comprising two stators, a turbine and a pump; a planetary gear train for an automatic transmission, wherein a reversal torque of a first stator reversing in a low speed ratio zone is converted into a normal torque by the planetary gear train so that this output from the first stator can be added to an output shaft, when a first speed of the planetary gear transmission is selected; a friction element is provided for limiting the rotation of the first stator in the speed ratio zone where the first stator rotates in the reverse direction; and the first stator, equipped with a one-way clutch, transmitting a torque only in a specified direction, is adapted to run idle so that a fluid loss at a stator portion can be minimized, when a second speed of the planetary gear transmission is selected.

(2) Function

In the first speed, the normal torque of the turbine and the reversal torque of the first stator are combined by the planetary gear transmission for a combined high torque ratio.

In the second speed, the first stator is locked by the friction element and at the same time the first stator is adapted to run idle in a speed ratio zone before the second stator runs idle for obtaining a high efficiency.

DETAILED DESCRIPTION OF THE INVENTION

(First Embodiment)

Figure 2:
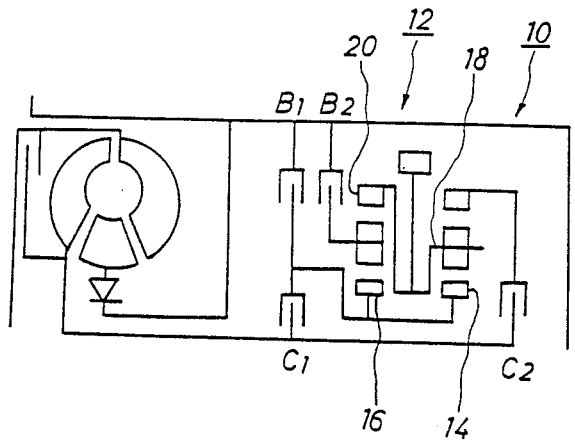
FIGS. 2 & 3 are schematic structural diagrams showing conventional embodiment respectively.
Figure 1:
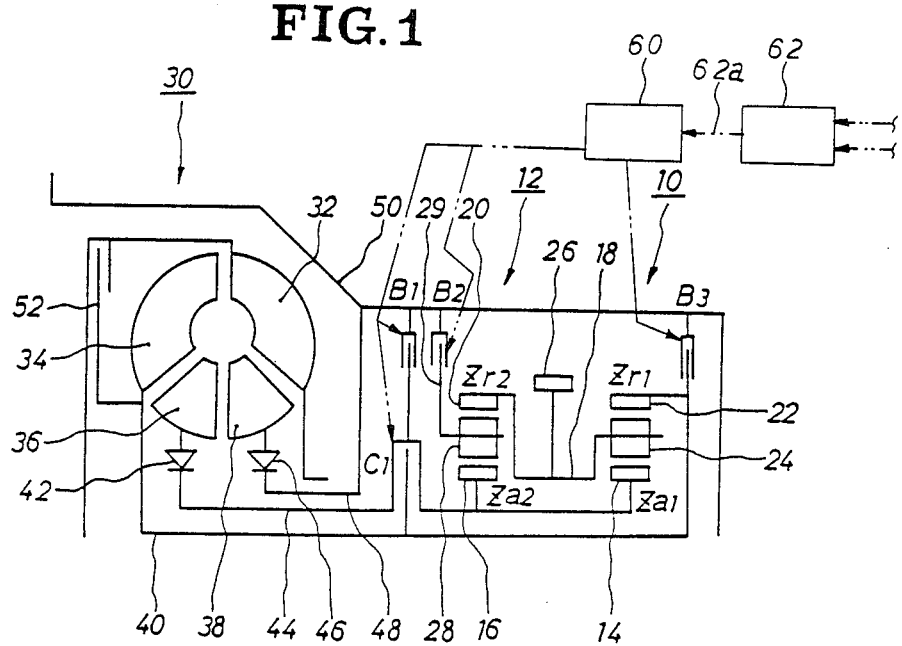
FIG. 1 is a schematic structural diagram showing a first embodiment according to the invention.

A first embodiment forming an automatic transmission providing three forward speeds and one reverse speed for a front drive automobile will be described with reference to FIG. 1. In FIG. 1, a member attached with the same symbol as FIG. 2 is a member identical with or a corresponding to that of FIG. 2.

In FIG. 1, 30 is a four-element two-stage torque converter, and the torque converter 30 is composed of a pump 32, a turbine 34, a first stator 36 and a second stator 38 etc.

The turbine 34 is connected to a turbine shaft 40, and the first stator 36 is connected through a one-way clutch 42 to a stator cylindrical shaft 44. The stator cylindrical shaft 44 is disposed concentrically with and rotatably upon the turbine shaft 40. The one-way clutch 42 runs idle when the first stator 36 rotates in the same direction as the turbine 34 i.e. in normal direction, and locks when the first stator rotates in the opposite direction, so as to transmit a reversal torque of the first stator 36 to the stator cylindrical shaft 44. The second stator 38 is connected through a one-way clutch 46 to a fixed cylindrical shaft 48. The fixed cylindrical shaft 48 is disposed radially outside of and concentrically with the stator cylindrical shaft 44. The fixed cylindrical shaft 48 is connected to a housing 50. Further, the turbine is equipped with a lock-up clutch 52. A so-called Simpson's planetary gear train, which will be described later in details, is combined with a rear stage of the above-mentioned torque converter 30 to constitute an automatic transmission.

The turbine shaft 40 extends in a right direction of a planetary gear assembly 10 of FIG. 1 to be connected to a ring gear 22 (number of teeth: Zr1). The ring gear 22 meshes with a planetary gear 24 carried by a planetary carrier 18. An output gear 26 is connected to an intermediate portion of the planetary carrier 18, and a ring gear 20 (number of teeth: Zr2) is fixed to a left end in FIG. 1 of the planetary carrier 18. A brake B3 for limiting rotation of the turbine shaft 40 is provided radially outside of the turbine shaft 40.

A planetary gear 28 of a planetary gear assembly 12 is carried by a planetary carrier 29, and a brake B2 is equipped to the planetary carrier 29. A clutch C1 is interposed between the turbine shaft 40 and the stator cylindrical shaft 44 connecting to a sun gear 14 (number of teeth: Za1) and a sun gear 16 (number of teeth: Za2). The clutch C1 is adapted to engage or disengage the turbine shaft 40 with or from the stator cylindrical shaft 44. Further, a brake B1 for limiting a rotation of the stator cylindrical shaft 44 is provided radially outside of the clutch C1.

The foregoing brakes B1-B3 and the clutch C1 are so constructed as to be actuated by well-known conventional hydraulic power. A hydraulic unit 60 supplying hydraulic pressure to these friction elements is designed to be switched and controlled at will by a well-known signal processing system 62 (micro computer) which outputs a control signal 62a to the hydraulic unit 60 upon receipt for example of a driving condition signal such as a speed signal, an acceleration pedal depression signal etc. Function will be described hereunder. In the foregoing planetary gear train, a speed change of three forward speeds and one reverse speed is performed by selectively actuating the brakes B1-B3 and the clutch C1 as tabulated in the following Table 3.

TABLE 3

|  | Brake & clutch | | | |
| --- | --- | --- | --- | --- |
|  | C1 | B1 | B2 | B3 |
| 1st | — | — | 0 | — |
| 2nd | — | 0 | — | — |
| 3rd | 0 | — | — | — |
| Rev | — | — | — | 0 |

In a first speed where only the brake B2 is actuated, the stator cylindrical shaft 44 connected to the sun gear 14 & 16 rotates in a direction opposite to a rotation direction of the turbine shaft 40. Consequently, a reversal torque of the first stator is transmitted as a normal torque from the stator cylindrical shaft 44 through the sun gear 16 of the planetary gear assembly 12 to the ring gear 20, and is added to a normal torque of the turbine 34 to be outputted from the output gear 26. Namely, the reversal torque is added to the normal torque of the turbine 34 in the region where the first stator 36 generates its reversal torque, so that efficiency and torque ratio are improved.

Figure 1A:
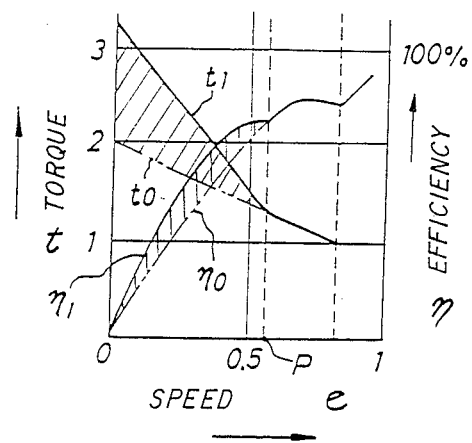
FIG. 1a is a graphical illustration of a torque ratio and an efficiency plotted against a speed ratio in a first speed.

Namely, as graphically illustrated in FIG. 1a showing a torque ratio t and an efficiency n plotted against a speed ratio e, the efficiency can be improved from a conventional efficiency characteristic η0 to an efficiency characteristic η1 and the torque ratio can be improved from a torque ratio characteristic t0 to a torque ratio charcteristic t1 respectively, in a speed ratio zone smaller than P (speed ratio e=0.55) where the rotation direction of the first stator 36 changes to the normal direction. In a speed ratio zone larger than or equal to P, the first stator 36 runs idle because of the function of the one-way clutch 42.

In a second speed where only the brake B1 is actuated, the first stator 36 is locked to increase torque transmitted from the turbine 34 in speed ratio zone before the first stator 36 runs idle. Further, since the first stator runs idle in the speed ratio zone before the second stator 38 runs idle, a loss due to fluid of the stator portion can be lessened so that the efficiency can be improved in this speed ratio zone.

Figure 1B:
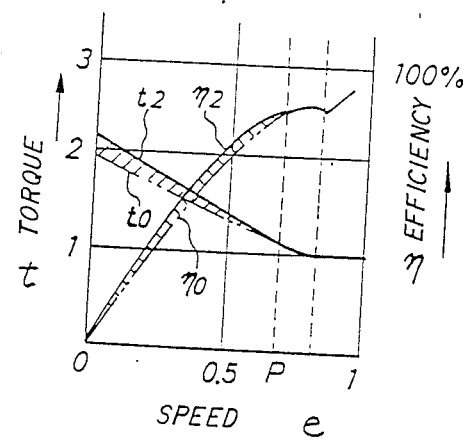
FIG. 1b is the same graphical illustration in second and fourth speeds.
Figure 1C:
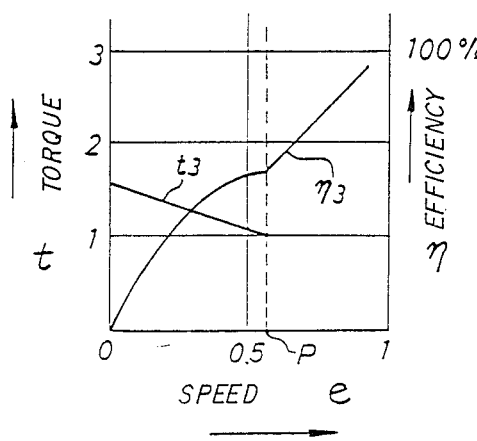
FIG. 1c is the same graphical illustration in a third speed.

In this second speed zone, the improvements are effected from an efficiency characteristic η0 to an efficiency characteristic η2 and from a torque ratio characteristic t0 to a torque ratio characteristic t2 respectively as graphically illustrated by FIG. 1b.

Further, in a third speed where only the clutch C1 is actuated, an efficiency characteristic η3 and a torque ratio characteristic t3 are obtainable.

Figure 1D:
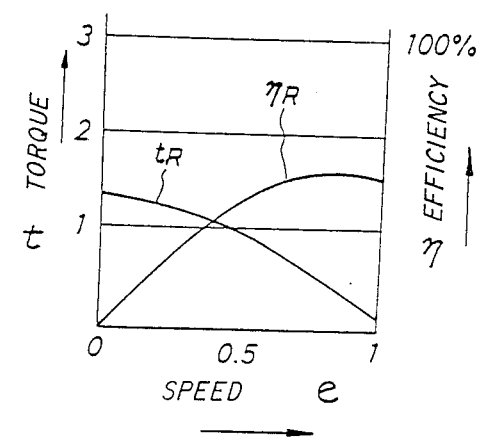
FIG. 1d is the same graphical illustration in a reverse speed.

Finally, in a reverse speed where the brake B3 is actuated, the turbine 34 is locked and only the reversal torque is transmitted from the first stator 36 through the sun gear 14 to the planetary gear assembly 10. Thus the output shaft 26 is reversed through the planetary gear 24. In this reverse speed, the improvements are effected to provide an efficiency characteristic ηR and a torque ratio characteristic tR as graphically illustrated by Fig. 1d.

Speed change ratios for each foregoing speed change stage are as tabulated in the following Table 4.

TABLE 4

| | Brake & clutch | |
| --- | --- | --- |
| | Turbine | First stator |
| 1st | $\frac{Za2Zr1 + Za1Za2 + Za1Zr2}{Za2 + Zr1}$ | $-\frac{Zr2}{Za2}$ |
| 2nd | $\frac{Zr1 + Za1}{Zr1}$ | — |
| 3rd | 1 | — |
| Rev | — | $\frac{Zr1 + Za1}{Za1}$ |

On the assumption that the number of teeth: Za1=- Za2=33 and Zr2=72 in Table 4; a speed change ratio of the turbine 34 is 2.458 and that of the first stator 36 is −2.182 for the first speed, the speed change ratio of the turbine 34 is 1.458 for the second speed and 1 for the third speed, and the speed change ratio of the first stator 36 is 3.182 for the reverse speed.

(Effect of the Invention)

As described above, the planetary gear train for the automatic transmission according to the first embodiment of the present invention includes the following effect.

In the first speed; the reversal torque of the first stator 36 is transmitted through the stator cylindrical shaft 44 to the sun gear 16 of the planetary gear assembly 12. The reversal torque of the first stator 36 thus transmitted is added through the sun gear 14 to the normal torque of the turbine 34 which is transmitted from the ring gear 22 connected to the turbine shaft 40 through the planetary gear 24 to the planetary carrier 18 so that the efficiency and the torque ratio can be improved in the region where the first stator 36 rotates in the reverse direction.

Accordingly, as graphically illustrated in FIG. 1a, the efficiency can be improved from the conventional efficiency characteristic η0 to the efficiency characteristic η1 and the torque ratio can be improved from the torque ratio characteristic t0 to the torque ratio characteristic t1 respectively, in the speed ratio zone smaller than the point P where the rotation direction of the first stator 36 changes to the normal direction.

In the second speed where only the brake B1 is actuated, the first stator 36 is locked to increase the torque transmitted from the turbine 34 in the speed ratio zone before the first stator 36 runs idle. Further, since the first stator runs idle in the speed ratio zone before the second stator 38 runs idle, the loss due to fluid of the stator portion can be lessened so that the efficiency can be improved in this speed ratio zone.

Consequently, the improvements are effected from the efficiency characteristic η0 to the efficiency characteristic η2 and from the torque ratio characteristic t0 to the torque ratio characteristic t2 respectively for obtaining the high torque ratio and high efficiency, as graphically illustrated by FIG. 1b.

As seen from the above description, the torque ratio and the efficiency can be improved in the first speed and second speed.

Moreover, the gear train requires only one clutch having complicated structure and the long axial length, so that overall sizes of the automatic transmission can be minimized.

(Second Embodiment)

A second embodiment of the present invention is summarized as follows. In an automatic transmission in which a Ravineaux's planetary gear train including a single row planetary gear and a double row planetary gear, both having one planetary carrier in common, is disposed at a rear stage of a four-element torque converter composed of two stators, a turbine and a pump; a planetary gear train of the automatic transmission includes a turbine shaft connecting the turbine to a sun gear of the double row planetary gear, a stator cylindrical shaft connecting a first stator with a sun gear of the single row planetary gear, a brake for limiting the rotation of the stator cylindrical shaft, a brake for limiting the rotation of the planetary carrier, so that an output is taken out from a ring gear of the single row planetary gear.

The above structure will function as described below.

In a first speed, reversal torque of the first stator is inputted in the single row planetary gear and added to the turbine shaft.

In a second speed and fourth speed, the first stator is locked and permitted to run idle in a speed ratio zone before the second stator runs idle. Thus a high efficiency can be obtained.

In the reverse speed, the turbine is locked to take out the reversal torque of the first stator.

Figure 3:
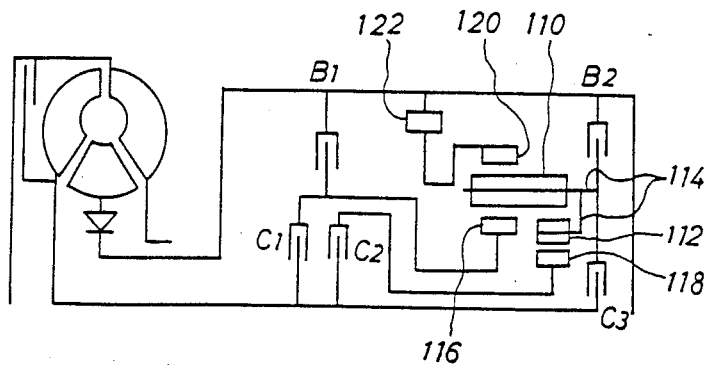
Figure 4:
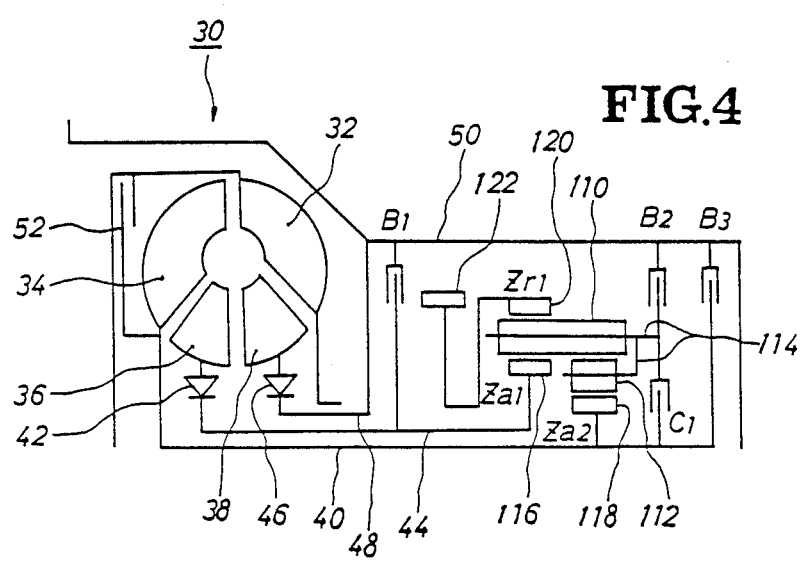
FIG. 4 is a schematic structural diagram showing a second embodiment according to the invention.

An automatic transmission providing three forward speeds and one reverse speed for front drive automobile according to the second embodiment will be described hereunder with reference to FIG. 4. In FIG. 4, a member with the same symbol as FIG. 3 or FIG. 1 is a member identical with or corresponding to that of FIG. 3 or FIG. 1, and only members different therefrom will be described hereunder. Further, each friction member is operated by the hydraulic unit 60 and signal processing system 62 of FIG. 1 in the same manner and are applied to the following embodiments in such same.

A so-called Ravineaux's planetary gear train, which will be described later in details, is combined with the rear stage of the above-mentioned torque converter 30 to constitute an automatic transmission.

A sun gear 118 (number of teeth: Za2) is connected to turbine shaft 40, and a planetary carrier 114 is equipped to a rear end portion of turbine shaft 40 through clutch C1. The brake B2 is provided radially outside of the planetary carrier 114 and at the rearmost end of the turbine shaft 40.

Further, a sun gear 116 (number of teeth: Za1) is connected to the stator cylindrical shaft 44. Brake B1 is connected to an intermediate portion of the stator cylindrical shaft 44. A ring gear 20 (number of teeth: Zr1) meshing with an outer periphery of a planetary gear 110 is connected to an output gear 122, and an output is taken out from the output gear 122.

Function of the automatic transmission illustrated in FIG. 4 will be described hereunder. In the foregoing planetary gear train, a speed change of three forward speeds and one reverse speed is performed by selectively actuating the brakes B1-B3 and the clutch C1 as tabulated in Table 5 in details.

In a first speed where only the brake B2 is actuated; a reversal torque of the first stator 36 is transmitted through the stator cylindrical shaft 44 to the sun gear 116, and is added through a planetary gear 110 to a normal torque of the turbine 34 which is transmitted from the turbine shaft 40 to a sun gear 118 and a planetary gear 112. The efficiency and the torque ratio are improved in the region where the first stator rotates in the reverse direction.

Namely, as graphically illustrated in FIG. 1a showing a torque ratio t and an efficiency $\eta$ plotted against a speed ratio e, the efficiency can be improved from a conventional efficiency characteristic $\eta$ to an efficiency characteristic $\eta 1$ and the torque ratio can be improved from a torque ratio characteristic t0 to a torque ratio characteristic t1 respectively, in a speed ratio zone smaller than P where the rotation direction of the first stator 36 changes to the normal direction. In a speed ratio zone larger than or equal to P, the first stator 36 runs idle owing to a function of the one-way clutch 42.

In a second speed where only the brake B1 is actuated, the first stator 36 is locked to increase torque transmitted from the turbine 34 in a speed ratio zone before the first stator 36 runs idle. Further, since the first stator runs idle in the speed ratio zone before the second stator 38 runs idle, a loss due to fluid of the stator portion can be lessened so that the efficiency can be improved in this speed ratio zone.

In this second speed zone, the improvements are effected from an efficiency characteristic $\eta 0$ to an efficiency characteristic $\eta 2$ and from a torque ratio characteristic t0 to a torque ratio characteristic t2 respectively as graphically illustrated by FIG. 1b.

Further, in a third speed where only the clutch C1 is actuated, an efficiency characteristic $\eta 3$ and a torque ratio characteristic t3 are obtainable.

Finally, in a reverse speed where the brake B3 is actuated, the turbine 34 is locked, and only the reversal torque is transmitted from the first stator 36 through the sun gear 116 to the planetary gear 10, thus the ring gear 120 and the output gear 122 are reversed. In this reverse speed, the improvements are effected to provide an efficiency characteristic $\eta R$ and a torque ratio characteristic tR as graphically illustrated by FIG. 1d.

(Third Embodiment)

Figure 5:
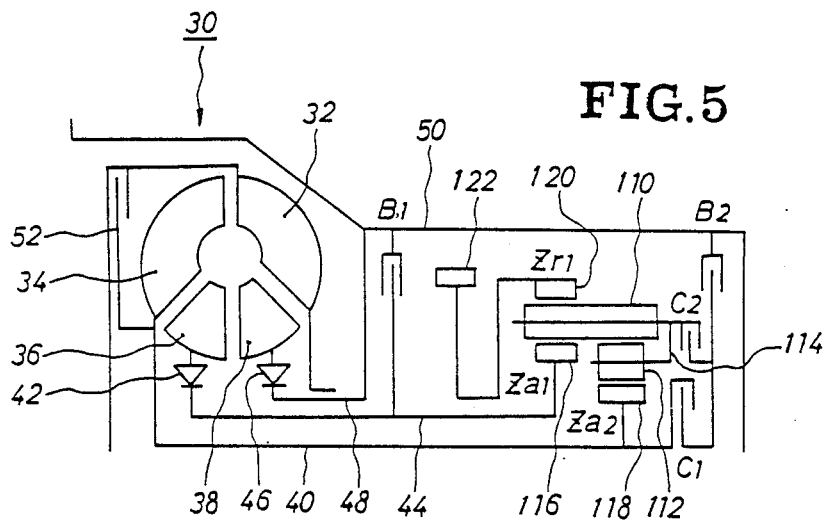
FIG. 5 is a schematic structural diagram of a third embodiment according to the invention.

In FIG. 5 showing the third embodiment of the present invention, the brake B3 (FIG. 4) is eliminated and a clutch C2 is connected to the planetary carrier 114. The brakes and clutches are actuated as tabulated in Table 5, described later, to perform a speed change of three forward speeds and one reverse speed.

(Fourth Embodiment)

Figure 6:
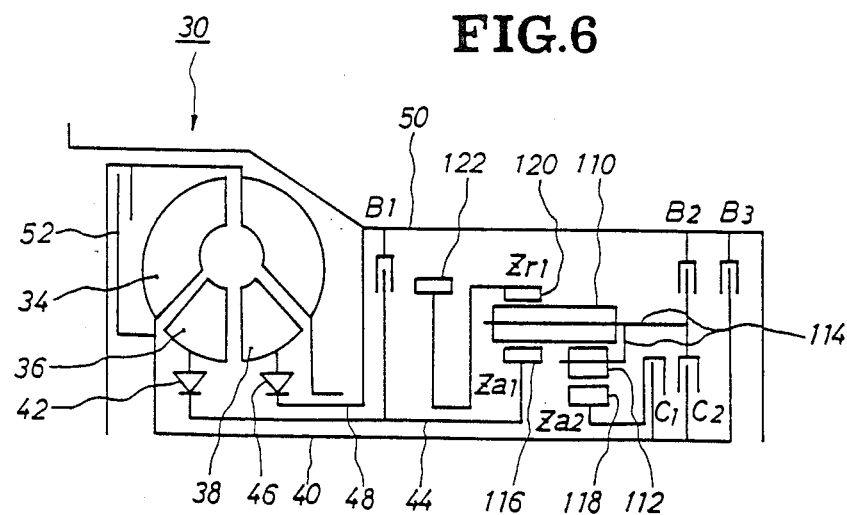
FIG. 6 is a schematic structural diagram of a fourth embodiment according to the invention.

In FIG. 6 showing the fourth embodiment for a speed change of four forward speeds and one reverse speed, the clutch C1 is interposed between the sun gear 118 and the turbine shaft 40. These brakes and clutches are actuated as tabulated in the following Table 5 to perform the speed change of four forward speeds and one reverse speed.

A torque ratio characteristic t and an efficiency eeeeacteristic $\eta$ become the same as in FIG. 1b.

(Fifth Embodiment)

Figure 7:
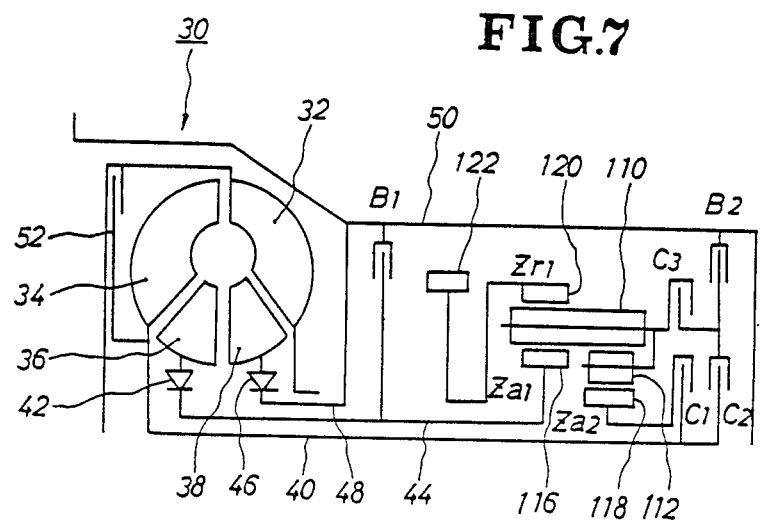
FIG. 7 is a schematic structural diagram of a fifth embodiment according to the invention.

In FIG. 7 showing the fifth embodiment of the present invention; the brake B3 is eliminated, the clutch C1 is interposed between the sun gear 118 and the turbine shaft 40, and a clutch C3 is attached to the planetary carrier 114. These brakes and clutches are actuated as tabulated in the following Table 5 to perform the speed change of four forward speeds and one reverse speed.

TABLE 5

| Shift | Brake & clutch | | | |
|---|---|---|---|---|
| | FIG. 4 | FIG. 5 | FIG. 6 | FIG. 7 |
| 1st | B2 | B2, C2 | B2, C1 | B2, C1, C3 |
| 2nd | B1 | B1 | B1, C1 | B1, C1 |
| 3rd | C1 | C1, C2 | C1, C2 | C1, C2, C3 |
| 4th | / | / | B1, C2 | B1, C2, C3 |
| Rev | B3 | B2, C1 | B3, C1 | B2, C1, C2 |

When the brakes and clutches are actuated as tabulated by Table 5, speed change ratios of the turbine 34 and the first stator 36 can be calculated by equations as tabulated in Table 6. In this instance, if numbers of teeth of the sun gears 116, & 118 and the ring gear 120 are assumed as follows, $$Za1=34, Za2=29, Zr1=74 \quad (1)$$

the speed change ratio of the turbine 34 is 2.552 and that of the first stator 36 is $-2.176$ for the first speed; the speed change ratio of the turbine 34 is 1.489 for the second speed, 1 for the third speed and 0.685 for the fourth speed; and the speed change ratio of the first stator 36 is 3.047 for the reverse speed.

TABLE 6

| | Speed change ratio | |
|---|---|---|
| | Turbine | First stator |
| 1st | $\dfrac{Zr1}{Za2}$ | $-\dfrac{Zr1}{Za1}$ |
| 2nd | $\dfrac{Zr1(Za1 + Za2)}{Za2(Za1 + Zr1)}$ | — |
| 3rd | 1 | — |
| 4th | $\dfrac{Za1}{Za1 + Zr1}$ | — |
| Rev | — | $\dfrac{Zr1(Za1 + Za2)}{Za1(Zr1 + Za2)}$ |

(Effect of the Invention)

As described above, the planetary gear train for automatic transmission according to the second -fifth embodiments of the present invention provide the following effect.

In the first speed; the reverse torque of the first stator 36 is transmitted through the stator cylindrical shaft 44 to the sun gear 116, and is added through the planetary gear 110 to the normal torque of the turbine 34 which is transmitted from the turbine shaft 40 to the sun gear 118 and the planetary gear 112. The efficiency and torque ratio are improved in the region where the first stator rotates in the reverse direction.

Accordingly, as graphically illustrated in FIG. 1a, the efficiency is improved from the conventional efficiency characteristic η0 to the efficiency characteristic η1 and the torque ratio is improved from the torque ratio characteristic t0 to the torque ratio characteristic t1 respectively in the speed ratio zone smaller than P where the rotation direction of the first stator 36 changes to the normal direction.

In the second speed where only the brake B1 is actuated; the first stator 36 is locked to increase torque transmitted from the turbine 34 in the speed ratio zone before the first stator 36 runs idle. Further, since the first stator 36 runs idle in the speed ratio zone before the second stator 38 runs idle, the loss due to the stator portion is lessened so that the efficiency can be improved in this speed ratio zone.

As graphically illustrated by FIG. 1b, the improvements are effected from the efficiency characteristic η0 to the efficiency characteristic η2 and from the torque ratio characteristic t0 to the torque ratio characteristic t2 respectively, so that the high torque ratio and high efficiency can be obtained. The embodiments of FIG. 6 and FIG. 7 can produce the effect shown by FIG. 1b in the fourth speed.

Since the torque ratios and efficiencies in the first, second and fourth speeds are improved as described above, the automatic transmission according to the present invention is able to provide the same performance as the conventional four forward speeds through means of the foregoing three forward speeds, and the same performance as the conventional five forward speeds through means of the foregoing four forward speeds. Consequently, as compared with the conventional automatic transmission, the same result as adding one stage to the stage number of speed change can be obtained by only adding one guide vane to the torque converter and connecting it to the sun gear, so that the structure and control are simplified.

Moreover, in the case of FIG. 2, the automatic transmission requires only one clutch having the complicated and axially long structure, so that the overall sizes of automatic transmission is minimized.

(Sixth Embodiment)

A sixth embodiment of the present invention is summarized as follows. In an automatic transmission in which a Ravineaux's planetary gear train including a single row planetary gear and a double row planetary gear both having one planetary carrier in common, is disposed at a rear stage of a four-element torque converter composed of two stators, a turbine and a pump; a planetary gear train of the automatic transmission includes a turbine shaft connecting the turbine to a sun gear of the single row planetary gear, a stator cylindrical shaft connecting a first stator to a sun gear of the double row planetary gear, a brake for limiting a rotation of the stator cylindrical shaft, a clutch installed between said stator cylindrical shaft and the turbine shaft or between the sun gear of the single row planetary gear and the turbine shaft, a brake for limiting a rotation of the ring gear of the single row planetary gear, so that an output is taken out from an output gear connected to the planetary carrier.

The above structure will function as described below.

In a first speed, the reverse torque of the first stator is inputted in the double row planetary gear to the turbine output torque.

In a second speed and fourth speed, the first stator is locked and permitted to run idle in a speed ratio zone before a second stator runs idle. Thus, high efficiency is obtained.

In a reverse speed, the turbine is locked to take out the reversal torque of the first stator.

An automatic transmission providing three forward speeds and one reverse speed for front drive automobile according to a sixth embodiment will be described hereunder with reference to FIG. 8.

A so-called Ravineaux's planetary gear train, which will be described later in details, is combined with the rear stage of the above-mentioned torque converter 30 to constitute an automatic transmission.

A sun gear 216 (number of teeth: Za2) is connected to turbine shaft 40, and the brake B3 is connected to a rear end portion of the turbine shaft 40. The brake B2 is equipped to a ring gear 220 (number of teeth: Zr2) meshing with a planetary gear 210.

Further, a sun gear 218 (number of teeth: Za1) is connected to the stator cylindrical shaft 44, and the brake B1 is equipped to an intermediate portion of the stator cylindrical shaft 44. A clutch C1 is interposed between the stator cylindrical shaft 44 and the turbine shaft 40.

A planetary carrier 214 is connected to an output gear 222 from which an output is taken out.

The function of the automatic transmission illustrated in FIG. 8 will be described hereunder. In the foregoing planetary gear train, a speed change of three forward speeds and one reverse speed is performed by selectively actuating (locking) the brakes B1–B3 and the clutch C1 as tabulated in Table 8 described later in details.

In a first speed where only the brake B2 is actuated; reverse torque of the first stator 36 is transmitted through the stator cylindrical shaft 44 to a sun gear 218, and is added through a planetary gear 212 to a normal torque of the turbine 34 which is transmitted from the turbine shaft 40 to a sun gear 216 through a planetary gear 210. The efficiency and the torque ratio are improved in a region where the first stator 36 rotates in the reverse direction.

Namely, as graphically illustrated in FIG. 1a showing a torque ratio t and an efficiency η plotted against a speed ratio e, efficiency is improved from a conventional efficiency characteristic η0 to an efficiency characteristic η1 and the torque ratio is improved from a torque ratio characteristic t0 to a torque ratio characteristic t1 respectively, in a speed ratio zone smaller than P when the rotation direction of the first stator 36 changes to the normal direction. In a speed ratio zone larger than or equal to P, the first stator 36 runs idle owing to a function of the one-way clutch 42.

In a second speed where only the brake B1 is actuated, the first stator 36 is locked to increase a torque transmitted from the turbine 34 in a speed ratio zone before the first stator 36 runs idle. Further, since the first stator runs idle in the speed ratio zone before the second stator 38 runs idle, a loss due to fluid of the stator portion is lessened so that the efficiency is improved in this speed ratio zone.

In this second speed zone, the improvements are effected from an efficiency characteristic η0 to an efficiency characteristic η2 and from a torque ratio characteristic t0 to a torque ratio characteristic t2 respectively as graphically illustrated by FIG. 1b.

Further, in a third speed where only the clutch C1 is actuated, an efficiency characteristic η3 and a torque ratio characteristic t3 are obtainable.

Finally, in a reverse speed where the brake B3 is actuated, the turbine 34 is locked, and only the reversal torque is transmitted as a reaction torque from the first stator 36 through the sun gear 218 and the fixed sun gear 216 to the planetary gear 210 and the planetary gear 212, reversing the ring gear 220 and the output gear 222. In this reverse speed, the improvements are effected to provide an efficiency characteristic ηR and a torque ratio characteristic tR as graphically illustrated by FIG. 1d.

Figure 9:
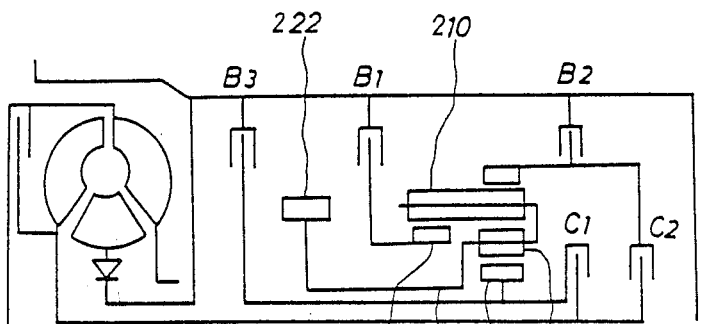
FIG. 9 is a schematic structural diagram of the conventional embodiment.

The conventional Ravineaux's planetary gear train including the single row planetary gear and the double row planetary gear both having one planetary carrier in common, is constructed as illustrated in FIG. 9.

Namely, 210 is a planetary gear comparatively long in its axial direction, and meshes with a sun gear 216 to constitute the single row planetary gear. Further, the planetary gear 210 is carried by a planetary carrier 214, a planetary gear 212 meshing with the planetary gear 210 is carried by the planetary carrier 214, and the planetary gear 212 meshes with a sun gear 218 to constitute the double row planetary gear. Moreover, the planetary carrier 214 is connected to the output gear 222.

Brakes B1, B2 & B3 and clutches C1 & C2 for controlling these gears are equipped and actuated as tabulated in the following Table 7 to perform a speed change of four forward speeds and one reverse speed.

Incidentally, the brake B3 is eliminated for the three forward speeds.

TABLE 7
(Prior art)

| | Brake & clutch | | | | |
|---|---|---|---|---|---|
| | B1 | B2 | B3 | C1 | C2 |
| 1st | O | — | — | O | — |
| 2nd | O | — | — | — | O |
| 3rd | — | — | — | O | O |
| 4th | — | — | O | — | O |
| Rev | — | O | — | O | — |

The stage number of speed change has recently been multiplied from three forward speeds to four forward speeds and further to five forward speeds in order to improve the performance of tractive force.

In the foregoing conventional planetary gear train, however, the number of clutches increases with an increase in the stage number of speed changes to cause a complex structure and troublesome controls.

If a stall torque ratio is increased in order to solve the above problem in the ordinary three-element one-stage torque converter, the following troubles will arise.

(1) Because of a decrease in a capacity of torque converter, the size of torque converter must be enlarged.

(2) The efficiency of torque converter becomes worse in the vicinity of its coupling point.

(3) A practical application limit of the stall torque ratio is about 3.

These troubles are overcome by the sixth embodiment as described above.

(Seventh Embodiment)

Figure 10:
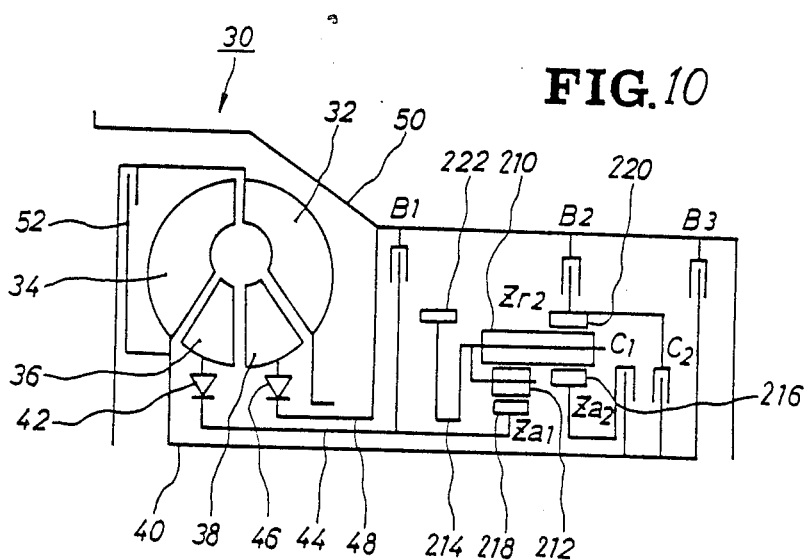
FIG. 10 is a schematic structural diagram of a seventh embodiment according to the invention.

In FIG. 10 showing the seventh embodiment of the present invention, the clutch C1 is interposed between a sun gear 216 and the turbine shaft 40, and the clutch C2 is interposed between a ring gear 220 and the turbine shaft 40. These brakes and clutches are actuated as tabulated in Table 8 to perform a speed change of four forward speeds and one reverse speed.

TABLE 8

Figure 8:
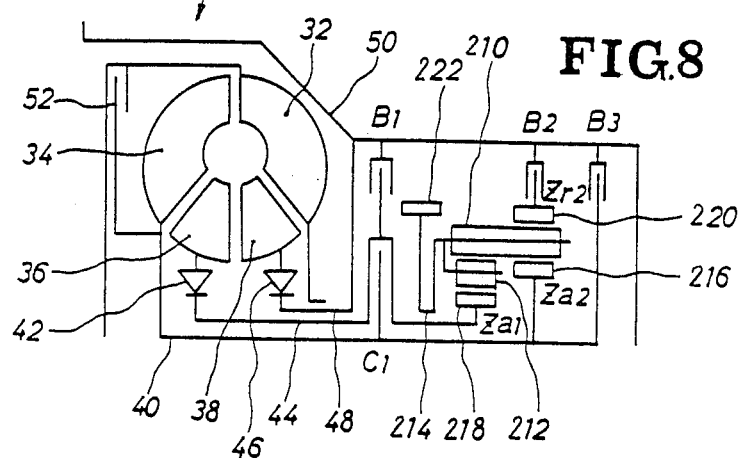
FIG. 8 is a schematic structural diagram of a sixth embodiment according to the invention.

| | Friction element | | Speed change ratio | |
|---|---|---|---|---|
| | FIG. 8 | FIG. 10 | Turbine | First stator |
| 1st | B2 | B2, C1 | $\frac{Za2 + Zr2}{Za2}$ | $-\frac{Zr2 - Za1}{Za1}$ |
| 2nd | B1 | B1, C1 | $\frac{Za1 + Za2}{Za2}$ | — |
| 3rd | C1 | C1, C2 | 1 | — |
| 4th | / | B1, C2 | $\frac{Zr2 - Za1}{Zr2}$ | — |
| Rev | B3 | B3, C1 | — | $\frac{Za1 + Za2}{Za1}$ |

When the brakes and clutches are actuated as tabulated by Table 8, speed change ratios of the turbine 34 and the first stator 36 can be calculated by equations as tabulated in Table 8. In this instance, if numbers of teeth of the sun gears 216 & 218 and the ring gear 220 are assumed as follows, $$Za1=21, Za2=72, Zr1=36 \qquad (1)$$

the speed change ratio of the turbine 34 is 3.000 and that of the first stator 36 is −2.429 for the first speed; the speed change ratio of the turbine 34 is 1.583 for the second speed, 1 for the third speed and 0.708 for the fourth speed; and the speed change ratio of the first stator 36 is 2.714 for the reverse speed.

(Effect of the Invention)

As described above, the planetary gear trains for automatic transmission according to the sixth and seventh embodiments of the present invention provide the following effect.

In the first speed; the reversal torque of the first stator 36 is transmitted through the stator cylindrical shaft 44 to the sun gear 218, and is added through the planetary gear 212 to the normal torque of the turbine 34 which is transmitted from the turbine shaft 40 to the sun gear 216 through the planetary gear 210, so that the efficiency and the torque ratio is improved in the region where the first stator rotates in the reverse direction.

Accordingly, as graphically illustrated in FIG. 1a, the efficiency is improved from the conventional efficiency characteristic η to the efficiency characteristic η1 and the torque ratio is improved from the torque ratio characteristic t0 to the torque ratio characteristic t1 respectively in the speed ratio zone smaller than P where the rotation direction of the first stator 36 changes to the normal direction.

In the second speed where only the brake B1 is actuated; the first stator 36 is locked to increase the torque transmitted from the turbine 34 in the speed ratio zone before the first stator 36 runs idle. Further, since the first stator 36 runs idle in the speed ratio zone before the second stator 38 runs idle, the loss due to fluid in stator portion is lessened so that the efficiency is improved in this speed ratio zone. Because the embodiment of FIG. 2 produces the effect shown by FIG. 1b in the fourth speed, the automatic transmission according to the present invention provides the same performance as the conventional four forward speeds through means of the foregoing three forward speeds, and the same performance as the conventional five forward speeds through means of the foregoing four forward speeds. Consequently, as compared with the conventional automatic transmission, the same result as adding one stage to the stage number of speed change is obtained by only adding one guide vane to the torque converter and connecting it to the sun gear, and the structure and control are simplified.

As mentioned above, the torque ratio and the efficiency are improved in the first, second and fourth speeds.

Moreover, in the case of FIG. 1, the automatic transmission requires only one clutch having the complicated and axially long structure, so that the overall sizes of automatic transmission is minimized.

(Eighth Embodiment)

An eighth embodiment of the present invention is summarized as follows. In an automatic transmission in which a planetary gear train having a pair of planetary gear assemblies comprising planetary gears, sun gears and ring gears, the sun gears being carried rotatably and independently, one planetary carrier of one planetary gear assembly being connected to the ring gear of the other planetary gear assembly, and an output being taken out from the planetary carrier, is disposed at a rear stage of a four-element torque converter composed of two stators, a turbine and a pump; a planetary gear train of the automatic transmission includes a turbine shaft connecting the turbine to the sun gear of one planetary gear assembly, a brake for limiting rotation of the turbine shaft, a stator cylindrical shaft connecting a first stator to the other sun gear, a brake for limitting a rotation of the stator cylindrical shaft, a clutch interposed between the stator cylindrical shaft and the turbine shaft for engaging or disengaging the both shafts, and a brake for limiting rotation of the other planetary carrier.

The above structure will function as described below.

In a first speed; the planetary carrier not connected to an output side is locked by the brake, a normal torque of the turbine is combined with the reverse torque of the first stator at the planetary gear assemblies, and a high torque ratio and a high efficiency are obtained.

In a second speed; the first stator is locked by the brake and permitted to run idle in a speed ratio zone before the second stator runs idle, so that a high torque ratio and a high efficiency are obtained.

The automatic transmission providing three forward speeds and one reverse speed for front drive automobile according to the eighth embodiment will be described hereunder with reference to FIG. 11.

A planetary gear train which will be described later in details, is combined with the rear stage of the above-mentioned torque converter 30 to constitute the automatic torque converter.

Figure 11:
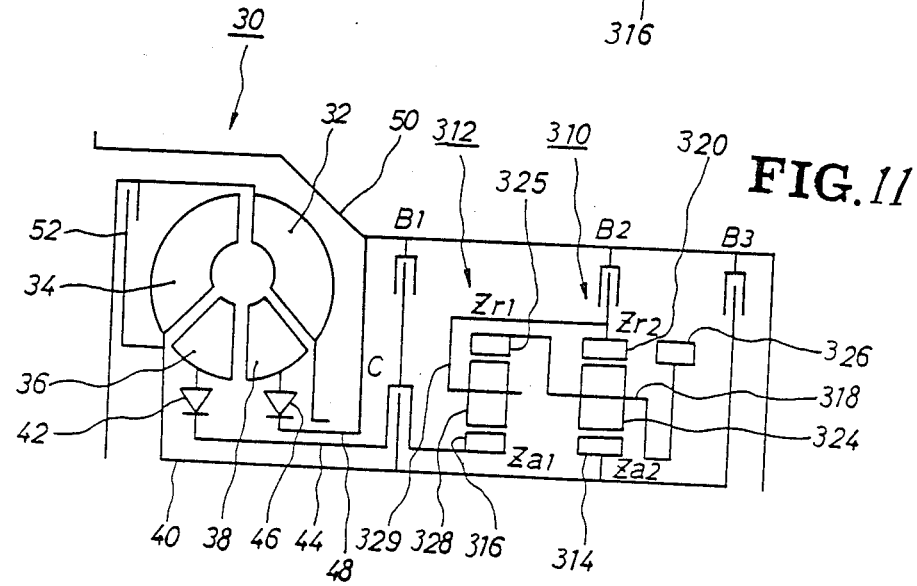
FIG. 11 is a schematic structural diagram of an eighth embodiment according to the invention.

The turbine shaft 40 extends to a right side in FIG. 11 of a planetary gear assembly 310 to be connected to a sun gear 314 (number of teeth: Za2) of the planetary gear assembly 310. The sun gear 314 meshes with a planetary gear 324 carried by a planetary carrier 318.

An output gear 326 is connected to a right end of the planetary carrier 318, and a ring 325 (number of teeth: Zr1) is fixed to a left end in FIG. 11 of the planetary carrier 318. The brake B3 for limiting the rotation of the turbine shaft 40 is disposed at a radial outside of the turbine shaft 40.

A planetary gear 328 of a planetary gear assembly 312 is carried by a planetary carrier 329, the planetary carrier 329 is connected to a ring gear 320 (number of teeth: Zr2) of the planetary gear assembly 312, and the brake B2 is disposed at a radially outside of the planetary carrier 329. A clutch C1 is interposed between the turbine shaft 40 and the stator cylindrical shaft 44 connecting to a sun gear 316 (number of teeth: Za1) of the planetary gear assembly 312, and the clutch C1 engages or disengages the turbine shaft 40 with or from the stator cylindrical shaft 44. Further, the brake B1 for limiting the rotation of the stator cylindrical shaft 44 is disposed at a radial outside of the clutch C1.

The function is described hereunder. In the foregoing planetary gear train, a speed change of three forward speeds and one reverse speed is performed by selectively actuating the brakes B1-B3 and the clutch C1 as tabulated in Table 9 described later in details.

In the first speed where only the brake B2 is actuated; a reversal torque of the first stator 36 is transmitted through the stator cylindrical shaft 44 to the sun gear 316 of the planetary gear assembly 312 and outputted as a normal torque from the ring gear 325 integral with an output shaft. The reverse torque of the first stator 36 is added through the sun gear 314 to a normal torque of the turbine 34 which is transmitted from the turbine shaft 40 through the ring gear 320 of the planetary gear assembly 310 to the planetary carrier 318 integral with the output shaft and outputted therefrom. The efficiency and the torque ratio is improved.

As graphically illustrated in FIG. 1a showing a torque ratio t and an efficiency $\eta$ plotted against a speed ratio e, the efficiency is improved from a conventional efficiency characteristic $\eta 0$ to an efficiency characteristic $\eta 1$ and the torque ratio is improved from a torque ratio characteristic t0 to a torque ratio characteristic t1 respectively, in a speed ration zone smaller than P where the rotation direction of the first stator 36 changes to the normal direction. In a speed ratio zone larger than or equal to P, the first stator 36 runs idle owing to a function of the one-way clutch 42.

In the second speed where only the brake B1 is actuated, the first stator 36 is locked to increase the torque transmitted from the turbine 34 in a speed ratio zone before the first stator 36 runs idle, thus providing a high torque ratio, and a high efficiency. In this second speed zone, the improvements are effected from an efficiency characteristic $\eta 0$ to an efficiency characteristic $\eta 2$ and from a torque ratio characteristic t0 to a torque ratio characteristic t2 respectively as graphically illustrated by FIG. 1b.

Further, in the third speed where only the clutch C1 is actuated, an efficiency characteristic $\eta 3$ and a torque ratio characteristic t3 are obtainable.

Finally, in the reverse speed where the brake B3 is actuated, the turbine 34 is locked, and only the reverse torque is transmitted from the first stator 36 through the sun gear 316 to the planetary gear assembly 312. Thus the ring gear 320 and the output gear 326 are reversed. In this reverse speed, the improvements are effected to provide an efficiency characteristic $\eta R$ and a torque ratio characteristic tR as graphically illustrated by FIG. 1d.

Speed change ratios at each speed change stage mentioned above become as tabulated in Table 10 which will be described later in details.

Figure 12:
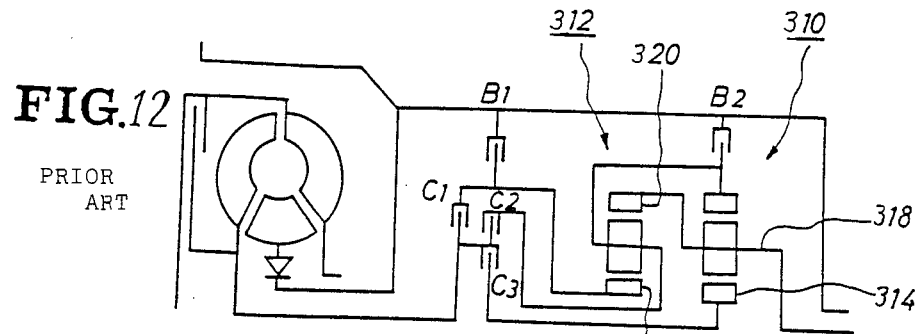
FIG. 12 is a schematic structural diagram showing the conventional embodiment.

A conventional automatic transmission composed of a planetary gear train including a pair of simple planetary gear assemblies having planetary carriers and ring gears in common with each other, a friction engagement system and a three-element one-stage torque converter, is constructed as illustrated in FIG. 12.

The pair of planetary gear assemblies 310 and 312, composed of planetary gears, planetary carriers and sun gears, are disposed at a rear stage of a three-element torque converter comprising one stator, a turbine and a pump; two sun gears 314 & 316 carried rotatably and independently; a planetary carrier 318 connected to ring gear 320; and an output can be taken out from the planetary carrier 318.

Brakes B1 & B2 and clutches C1, C2 & C3 for controlling these gears are equipped therein, and actuated as tabulated "0" in the following Table 11 to perform a speed change of four forward speeds and one reverse speed.

TABLE 11

|  | (Prior art) | | | | |
|---|---|---|---|---|---|
|  | Brake & clutch | | | | |
|  | B1 | B2 | C1 | C2 | C3 |
| 1st | — | 0 | — | — | 0 |
| 2nd | 0 | — | — | — | 0 |
| 3rd | — | — | — | 0 | 0 |
| 4th | 0 | — | — | 0 | — |
| Rev | — | 0 | 0 | — | — |

In the foregoing conventional planetary gear train, however, a large number of clutches are necessary and result in complex structure and troublesome control.

These problems are eliminated by the eighth embodiment as described above.

(Ninth Embodiment)

An automatic transmission providing four forward speeds and one reverse speed for front drive automobile according to the present invention will be described hereunder with reference to FIG. 13.

Figure 13:
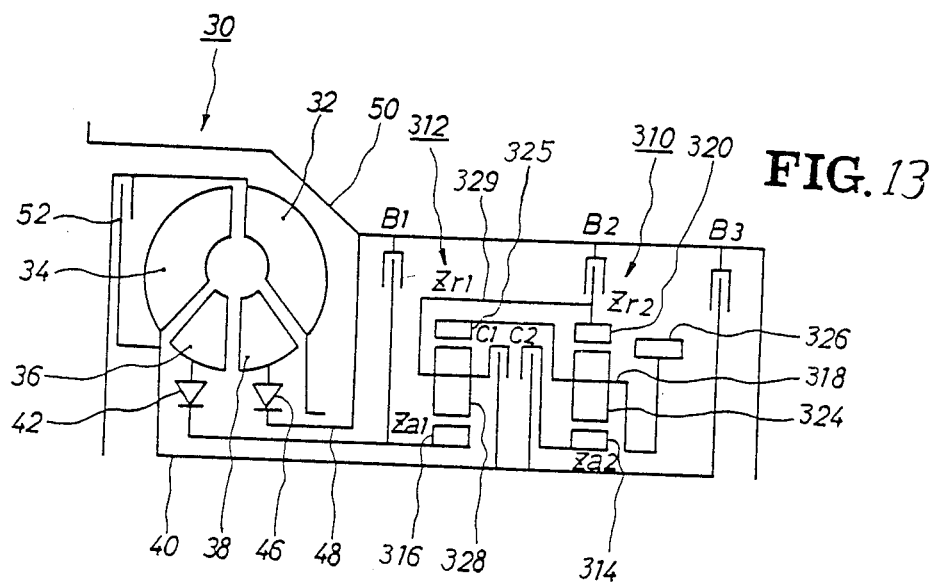
FIG. 13 is a schematic structural diagram of a ninth embodiment according to the invention.

In FIG. 13, the clutch C2 is interposed between the sun gear 314 and the turbine shaft 40, and the clutch C1 is interposed between the planetary carrier 329 and the turbine shaft 40.

In the above-mentioned planetary gear train, the brakes and clutches are actuated as tabulated in the following Table 9 to perform a speed change of four forward speeds and one reverse speed.

TABLE 9

|  | brake & clutch | |
|---|---|---|
|  | FIG. 1 | FIG. 13 |
| 1st | B1 | B2, C2 |
| 2nd | B1 | B1, C2 |
| 3rd | C1 | C1, C2 |
| 4th | / | B1, C1 |
| Rev | B3 | B3, C2 |

When the brakes and clutches are actuated as tabulated by Table 9, speed change ratios of the turbine 34 and the first stator 36 will become as tabulated by the following Table 10.

TABLE 10

|  | Speed change ratio | |
|---|---|---|
|  | Turbine | First stator |
| 1st | $\dfrac{Za2 + Zr2}{Za2}$ | $-\dfrac{Zr1}{Za1}$ |
| 2nd | $\dfrac{Za1Zr2 + Za2Zr1 + Za1Za2}{Za2Zr1 + Za1Za2}$ | — |
| 3rd | 1 | — |
| 4th | $\dfrac{Zr1}{Za1 + Zr1}$ | — |
| Rev | — | $\dfrac{Za1Zr1 + Za1Zr2 + Za1Za2}{Za1Zr2}$ |

In Table 10, if numbers of teeth are assumed as Za1=36, Za2=42 and Zr1=Zr2=75; the speed change ratio of the turbine 34 is 2.786 and that of the first stator 36 is −2.083 for the first speed; the speed change ratio of the turbine 34 is 1.579 for the second speed, 1 for the third speed and 0.676 for the fourth speed; and the speed change ratio of the first stator 36 is 2.726 for the reverse speed.

(Effect of the Invention)

As described above, the planetary gear trains for automatic transmission according to the eighth and ninth embodiments of the present invention provide the following effect.

In the first speed; a reverse torque of the first stator 36 is transmitted through the stator cylindrical shaft 44 to the sun gear 316 of the planetary gear assembly 312 and outputted as a normal torque from the ring gear 325 integral with an output shaft, and the reversal torque of the first stator 36 is added through the sun gear 314 to a normal torque of the turbine 34 which is transmitted from the turbine shaft 40 through the ring gear 320 of the planetary gear assembly 310 to the planetary carrier 318 integral with the output shaft and outputted therefrom. The efficiency and the torque ratio are improved.

Accordingly, as graphically illustrated in FIG. 1a, the efficiency is improved from a conventional efficiency characteristic $\eta 0$ to an efficiency characteristic $\eta 1$ and the torque ratio is improved from a torque ratio characteristic t0 to a torque ratio characteristic t1 respectively, in the speed ratio zone smaller than P where the rotation direction of the first stator 36 changes to the normal direction.

In a second speed where only the brake B1 is actuated, the first stator 36 is locked to increase torque transmitted from the turbine 34 in a speed ratio zone before the first stator 36 runs idle, and the improvements are effected from an efficiency characteristic $\eta 0$ to an efficiency characteristic $\eta 2$ and from a torque ratio characteristic t0 to a torque ratio charcteristic t2 respectively as graphically illustrated by FIG. 1b. Thus, a high torque ratio and a high efficiency can be improved.

As mentioned above, the torque ratio and the efficiency are improved in the first and second speeds.

Moreover, the automatic transmission requires only one clutch having the complicated and axially long structure, so that the overall sizes of automatic transmission is minimized.

What is claimed is:

1. In an automatic transmission incorporating a planetary gear transmission at a rear stage of a four-element torque converter comprising two stators, a turbine and a pump; a planetary gear train for an automatic transmission, wherein reverse torque of a first stator running in a reverse direction relative to a forward running direction of the turbine in a first low speed ratio zone is converted into torque in said forward running of said torque converter direction by said planetary gear train, so that a torque output from said first stator running in said first direction is added to an output shaft of said transmission when said planetary gear transmission is in said first low speed ratio zone; a friction element for limiting rotation of said first stator in said first speed ratio zone where said first stator rotates in said reverse direction said first stator having a one-way clutch for transmitting torque in said reverse direction and for running idle, when said first stator rotates in a forward running direction so that fluid loss in the stator portion of said torque converter is minimized when a second speed of said planetary gear transmission is selected.

2. In an automatic transmission, in which a Simpson's planetary gear train having a pair of planetary gear assemblies each comprising a planetary gear, a sun gear and a ring gear, the sun gear of one planetary gear assembly being connected to the sun gear of the other planetary gear assembly, a planetary gear carrier connected to the planetary gear of one of said planetary gear assemblies and connected to the ring gear of the other of said planetary gear assesmblies, and an output being taken out from said planetary carrier, is disposed at a rear stage of a four-element torque converter composed of two stators, a turbine and a pump; the planetary gear train of said automatic transmission including a turbine shaft connecting the turbine of said torque converter to the ring gear of one of said planetary gear assemblies, a brake for limiting the rotation of said turbine shaft, a stator cylindrical shaft connecting a first stator of said torque converter to the sun gears of said Simpson's planetary gear train, a brake for limiting a rotation of said stator cylindrical shaft, and a clutch interposed between said stator cylindrical shaft and said turbine shaft for engaging and disengaging said turbine shaft and said stator shaft, respectively.

3. A planetary gear train of an automatic transmission as set forth in claim 2, in which said first stator is connected to said stator cylindrical shaft through a oneway clutch which connects said first stator to said stator shaft in a low speed ratio zone where said first stator rotates in a direction reverse to a forward direction of rotation of said turbine and disconnects said first stator from said stator shaft and leaves said first stator to run idle in a high speed ratio zone where said first stator rotates in the forward direction with said turbine.

4. A planetary gear train of an automatic transmission as set forth in claim 2, in which said brake limits the rotation of said stator cylindrical shaft when a first speed is selected.

5. A planetary gear train of an automatic transmission as set forth in claim 2, in which said clutch limits the rotation of said stator cylindrical shaft in said low speed ratio zone when a second speed is selected.

6. In an automatic transmission in which a Simpson's planetary gear train having a pair of planetary gear assemblies comprising planetary gears, sun gears and ring gears, said sun gears being connected to each other, a planetary carrier connected to the planetary gear of one of said planetary gear assemblies and connected to the ring of the other gear of said planetary gear assemblies, and an output being taken out from said planetary carrier, is disposed at a rear stage of a four-element torque converter composed of two stators, a turbine and a pump; the planetary gear train of said automatic transmission including a turbine shaft connecting said turbine to the ring gear of one of said pair of planetary gear assemblies, a brake for limiting rotation of said turbine shaft, a stator cylindrical shaft connecting a first stator of said two stators to said sun gears, a brake for limiting the rotation of said stator cylindrical shaft connected to said first stator, a clutch interposed between said stator cylindrical shaft connected to said first stator and said turbine shaft for engaging and disengaging said shafts, said first stator being connected to said stator cylindrical shaft through a one-way clutch which connects said first stator to said stator cylindrical shaft in a low speed ratio zone where the first stator rotates in a reverse direction and for running idle in a high speed ratio zone where said first stator is rotated in a forward direction, said brake limiting the rotation of said stator cylindrical shaft connected to said first stator in a high speed ratio zone when a second speed is selected, said stator cylindrical shaft connected to said first stator being connected to said sun gears of said pair of planetary gear assemblies, a planetary carrier carrying a planetary gear of one of said planetary gear assemblies and meshing with one sun gear equipped with a brake for second speed, a ring gear meshing with said one sun gear connected to an output planetary carrier connecting to the other planetary gear, the other ring gear being freely engaged with or disengaged from said turbine shaft through a brake for third speed, a friction element for limiting rotation of the turbine to exert reverse torque on said first stator when a reverse speed is selected, and one element of the planetary gear train connected and fixed to the turbine so as to take out the reversal torque of the first stator while decelerating the first stator.

7. In an automatic transmission having a four-element torque converter composed of a first stator, a second stator, a turbine and a pump and a planetary gear train at a rear stage of said torque converter, said planetary gear train having a pair of planetary gear assemblies each comprising a planetary gear, a sun gear, a ring gear, and a planetary carrier the planetary carrier of one of said planetary gear assemblies being connected to the ring gear of the other of said planetary gear assemblies, and an output being taken out from said planetary gear carriers, said automatic transmission having a turbine shaft connecting said turbine to the ring of said one of said planetary gear assemblies, a brake for limiting rotation of the turbine shaft, a stator cylindrical shaft connecting said first stator to the sun gears of said pair of planetary gear assemblies, a brake for limiting the rotation of said stator cylindrical shaft, a clutch interposed between said stator cylindrical shaft and said turbine shaft for engaging or disengaging both said shafts, and a brake for limiting rotation of the planetary carrier of said other of said planetary gear assemblies.

8. A planetary gear train of an automatic transmission as set forth in claim 7, in which said first stator is connected to said stator cylindrical shaft through a one-way clutch which connects said first stator to said stator cylindrical shaft in a low speed ratio zone where said first stator rotates in a reverse direction from said turbine and runs idle in a high speed ratio zone where said first stator rotates in a forward direction with said turbine.

9. A planetary gear train of an automatic transmission as set forth in claim 7, in which said brake for limiting the rotation of said cylindrical shaft limits the rotation of said stator cylindrical shaft when said automatic transmission is in first speed.

10. A planetary gear train of an automatic transmission as set forth in claim 7, in which said clutch between said stator shaft and said turbine shaft limits the rotation of said stator cylindrical shaft in a low speed ratio zone when a second speed of said automatic transmission is selected.

11. In an automatic transmission having a four-element torque converter composed of a first stator, a second stator, a turbine and a pump and a planetary gear train at a rear stage of said torque converter, said planetary gear train having a pair of planetary gear assemblies, each of said pair of planetary gear assemblies having a planetary gear, a sun gear and a ring gear, one of said planetary gear assemblies having a planetary gear carrier carrying the ring gear of the other of said planetary gear assemblies, and an output being taken out from said planetary gear carrier, and an output being taken out from said planetary gear carrier, said automatic transmission having a turbine shaft connecting said turbine of said torque converter to the ring gear of one of said planetary gear assemblies, a brake for third speed for limiting rotation of said turbine shaft, a stator cylindrical shaft connecting said first stator to the sun gear of each of said pair of planetary gear assemblies and connecting said sun gears to each other, a brake for limiting rotation of said stator cylindrical shaft, a clutch interposed between said stator cylindrical shaft and said turbine shaft for engaging and disengaging said shafts with each other, a brake for second speed for limiting the rotation of a planetary gear carrier of said other of said planetary gear assemblies, said first stator being connected to said stator cylindrical shaft through a one-way clutch which connects said first stator to said stator shaft in a low speed ratio zone where the first stator rotates in a reverse direction relative to said turbine and runs idle in a high speed ratio zone where the first stator rotates in the same direction as the turbine, said brake for second speed limiting the rotation of said stator cylindrical shaft when a first speed is selected, and said clutch limiting the rotation of said stator cylindrical shaft in a low speed ratio zone when a second speed is elected.

12. In an automatic transmission in which a planetary gear train having a pair of of simple planetary gear assemblies comprising planetary gears, sun gears and ring gears, two sun gears being carried rotatably and independently, a planetary gear carrier of one planetary gear assembly of said planetary gear assemblies being connected to the ring gear of the other planetary gear assembly of said planetary gear assemblies, and an output being taken out from the planetary carrier, is disposed at a rear stage of a four-element torque converter composed of two stators, a turbine and a pump; a planetary gear train of the automatic transmission including a turbine shaft connecting the turbine to the ring gear of one planetary gear assembly, a brake for third speed for limiting a rotation of the turbine shaft, a stator cylindrical shaft connecting a first stator to the other sun gear, a brake for limiting rotation of the stator cylindrical shaft, a first clutch interposed between said one planetary carrier and the turbine shaft, a brake for second speed for limiting rotation of a planetary gear carrier of the other planetary gear assembly of said planetary gear assemblies, a second clutch interposed between the sun gear meshing with said other planetary gear and the turbine shaft, said first stator being connected to the stator cylindrical shaft through a one-way clutch which connects the former to the latter in a low speed ratio zone where the first stator rotates in a reverse direction and runs idle in a high speed ratio zone where the first stator is switched to rotate in a normal direction, said brake working to limit the rotation of the stator cylindrical shaft when a first speed is selected, and said first clutch working to limit the rotation of the stator cylindrical shaft in a low speed ratio zone when a second speed is selected.

* * * * *